United States Patent [19]
Kaesgen

[11] 3,970,272
[45] July 20, 1976

[54] ENGINE MOUNTING
[75] Inventor: Juergen Kaesgen, Brunswick, Ohio
[73] Assignee: MTD Products Inc., Cleveland, Ohio
[22] Filed: Apr. 18, 1975
[21] Appl. No.: 569,466

[52] U.S. Cl. .................................. 248/9; 248/15; 248/358 R
[51] Int. Cl.² .................................... F16F 15/00
[58] Field of Search ............. 180/64 R, 19 R, 53 R; 248/7, 9, 15, 22, 26, 358 R, 3, 5, 6, 8, 16, 23, 27 R; 310/51, 89, 91

[56] References Cited
UNITED STATES PATENTS

| | | | |
|---|---|---|---|
| 1,883,893 | 10/1932 | Flaherty | 248/358 R |
| 1,899,596 | 2/1933 | Stein | 248/26 |
| 2,020,092 | 11/1935 | Allen | 248/26 |
| 2,328,614 | 9/1943 | Busse | 248/358 R |
| 2,627,936 | 2/1953 | Martinet | 248/358 R X |
| 2,717,134 | 9/1955 | Ferber | 248/358 R X |
| 2,748,553 | 6/1956 | Funk | 180/19 R |
| 3,075,601 | 1/1963 | Muller | 180/64 R |
| 3,154,704 | 10/1964 | Shaffer | 310/51 |
| 3,311,290 | 3/1967 | Szymczak et al. | 248/26 X |
| 3,398,807 | 8/1968 | Berger | 248/9 X |
| 3,429,533 | 2/1969 | Harkness | 249/9 |
| 3,841,425 | 10/1974 | Harkness | 248/9 X |

FOREIGN PATENTS OR APPLICATIONS

| | | | |
|---|---|---|---|
| 402,242 | 10/1941 | Italy | 317/101 R |
| 592,661 | 5/1959 | Italy | 248/358 R |
| 922,452 | 4/1963 | United Kingdom | 180/64 R |

Primary Examiner—Lawrence J. Staab
Attorney, Agent, or Firm—Woodling, Krost, Granger & Rust

[57] ABSTRACT

Means for mounting an engine to a tractor or the like to minimize transmission of vibration between the engine and the tractor or the like, wherein metal to metal contact is avoided and the engine is firmly held down in position on the tractor or the like and against lateral movement. This is an abstract only of the specific illustration of the invention given by way of example, and is not to be used in the interpretation of the claims nor as a limitation on the scope of the invention.

9 Claims, 4 Drawing Figures

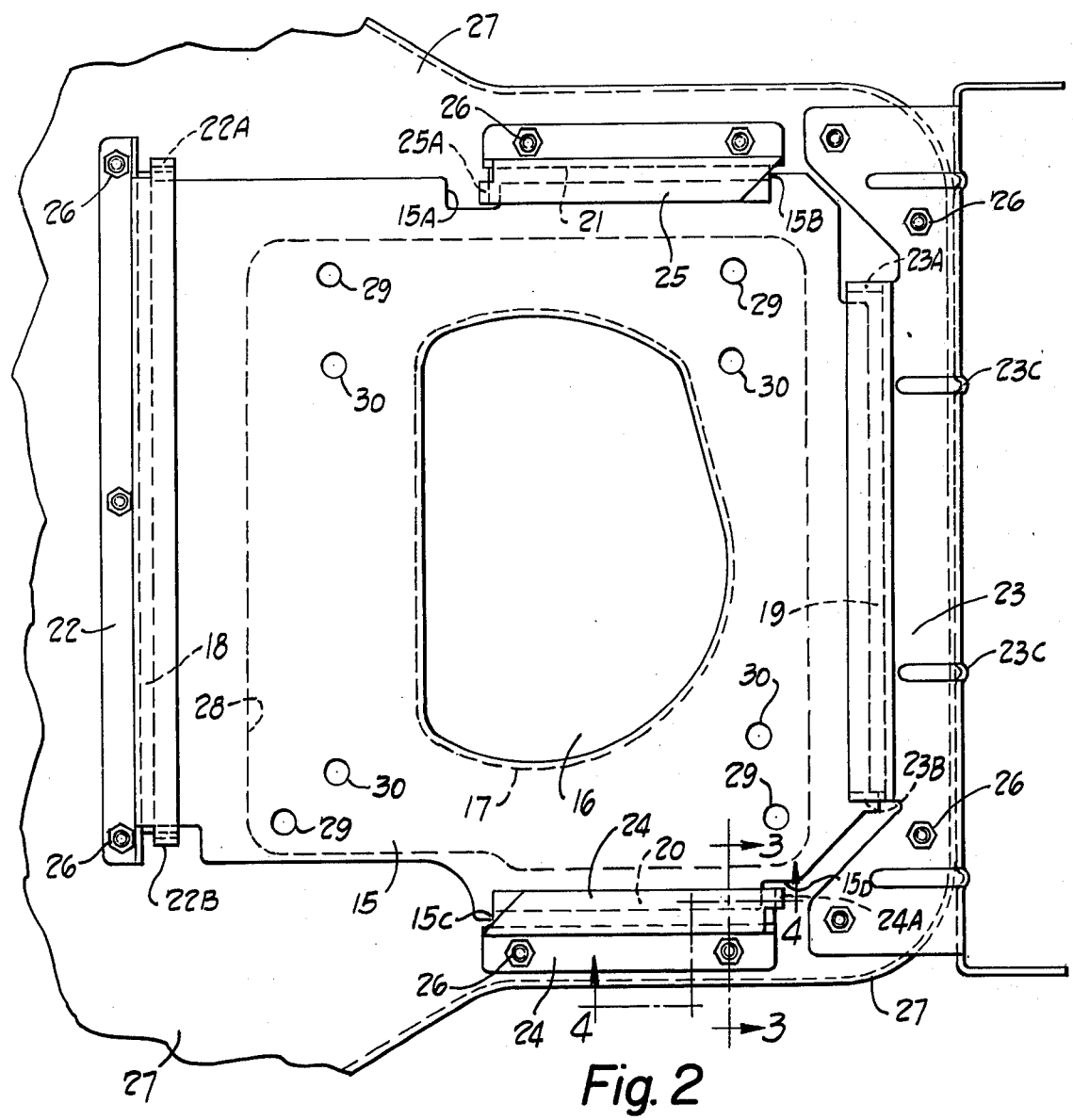
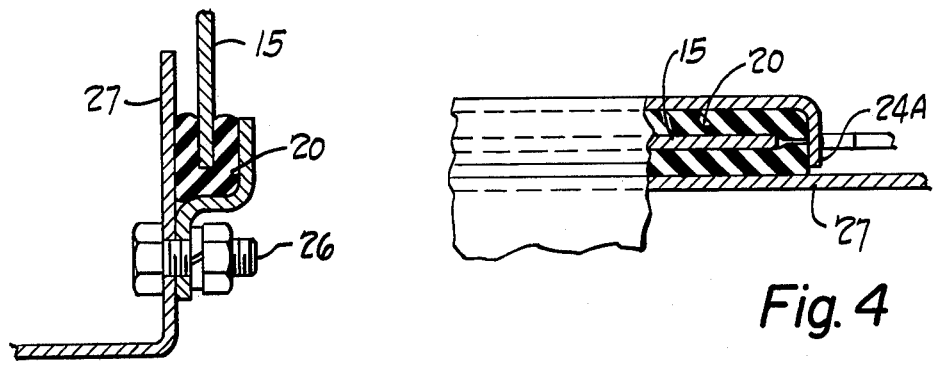
Fig. 2
Fig. 3
Fig. 4

ENGINE MOUNTING

My invention is directed to means for mounting an engine, such as an internal combustion engine or electric motor, to a tractor or the like. By the term tractor or the like I intend to include riding and walking grass mowers, agricultural implements, vehicles, and other devices wherein an engine is to be mounted on the device. For purpose of simplicity, such devices will be here referred to as tractors or the like.

It is recognized that engines have been mounted on tractors or the like by means of spaced rubber blocks having bolts or the like embedded in the rubber blocks or extending through the blocks. While the prior devices have provided some degree of adequacy, they have been found to be inefficient, awkward to mount, and lacking in many of the characteristics desired for maximum isolation of an engine from a tractor or the like to minimize transmission of vibration therebetween.

An object of my invention is to provide improvement in the arrangement and structure for such mounting means to increase the efficiency thereof and to provide economy and facility in the mounting operation.

Other objects and a fuller understanding of this invention may be had by referring to the following description and claims, taken in conjunction with the accompanying drawings, in which:

FIG. 2 is a plan view looking in the direction of the arrows 2—2 of FIG. 1, but with the engine removed;

FIG. 3 is an enlarged cross-sectional view taken through the line 3—3 of FIG. 2; and FIG. 4 is an enlarged sectional view taken through the line 4—4 of FIG. 2.

Figure 1:
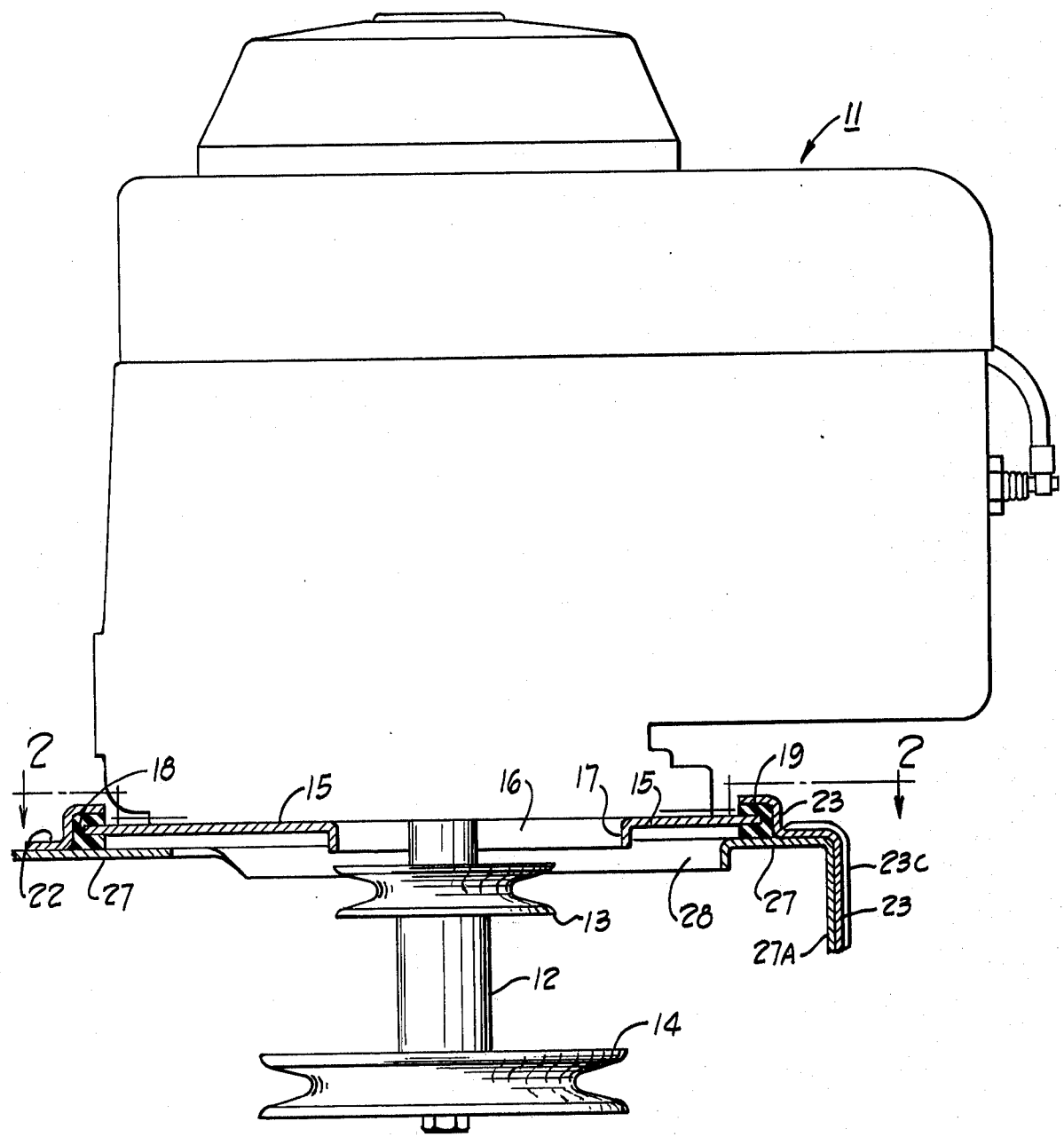
FIG. 1 is a longitudinal cross-sectional view of a front end of a tractor or the like with an engine mounted thereon.

In the drawings I show an engine generally by the reference character 11. Extending downwardly from the engine 11 is a driving shaft 12 carrying thereon an upper pulley 13 and a lower pulley 14 adapted to have driving belts reeved thereabout for driving the tractor or the like and working parts carried thereby.

The tractor or the like has a generally flat supporting metal portion 27 disposed in a generally horizontal plane adapted to carry the weight of the engine thereon. This supporting portion 27 has an opening 28 therethrough for accommodating the shaft 12 extending downwardly from the engine 11.

A rigid steel plate 15 somewhat larger than the opening 28 is positioned above the supporting portion 27 as indicated in the drawings. This steel plate 15 has a central opening 16 therethrough, shown both in FIGS. 1 and 2, through which the shaft 12 extends. Surrounding the periphery of the opening 16 is a reinforcing flange 17 extending downwardly from the plane of the plate 15.

As better seen in FIG. 2, the plate 15 has a forward peripheral edge portion, a rearward peripheral edge portion, a left-hand side peripheral edge portion and a right-hand side peripheral edge portion. These peripheral edge portions are disposed along opposite sides of the plate 15 and are spaced from each other as shown in the drawings.

The plate 15 has two sets of holes therein for accommodating two different sizes or kinds of engines. One set of four openings 29 is spaced to accommodate the lugs of one engine so that one engine may be secured to the plate 15 by bolts extending through the one set of four openings 29. There is another set of four openings 30 adapted to accommodate bolts to be attached to lugs of another engine having its lugs spaced differently from the lugs of the first mentioned engine. Thus by providing appropriate sets of openings in the plate 15, different sizes and designs of engines may be accommodated and secured thereto.

I provide four sets of resilient pads of rubber-like material. Each of these pads is U-shaped with the recess of the U-shape directed toward the plate 15 so as to receive a peripheral edge portion within the recess. There is a pad 18 accommodating the rearwardly disposed peripheral edge portion of the plate 15, a pad 19 accommodating the forward peripheral edge portion of the plate 15, a pad 20 accommodating the right-hand side peripheral edge portion of the plate 15 and a pad 21 accommodating the left-hand side peripheral edge portion of the plate 15. These pads 18, 19, 20 and 21 are similar in cross-section but have different lengths corresponding with the length of the peripheral edge portion to be accommodated by each pad.

The material of each pad is rubber, synthetic rubber or other elastomeric material of suitable resiliency and yet firm enough to appropriately support the weight of the engine being mounted on the tractor or the like. It is noted that each pad snugly embraces the corresponding peripheral edge portion of the plate so that one arm of the U-shape is over the plate, the other arm of the U-shape is under the plate and the base of the U-shape abuts the outermost edge of the plate. Thus the plate 15 is firmly held by the pads against both up and down movement and against lateral movement.

There are provided four clamping members for clamping the pads and the plate 15 held thereby to the supporting portion 27 of the tractor or the like. Along the rearward peripheral edge portion of the plate 15 there is a clamping bracket 22, along the forwardmost peripheral edge portion of the plate 15 there is a clamping bracket 23, along the left-hand peripheral edge portion of the plate 15 there is a clamping bracket 25, and along the right-hand peripheral edge portion of the plate 15 there is a clamping bracket 24. These clamping brackets have offset portions in a generally horizontal plane which engage the uppermost surface of the respective pads, and have a generally upright portion which engages the outermost surface of the pads. Thus the pads are held both downwardly toward the supporting portion 27 and also laterally inwardly toward the plate 15. The outermost portions of the clamping brackets are secured by suitable nut and bolt assemblies 26 where indicated in the drawings.

It may be noted that the forwardmost clamping bracket 23 extends forwardly and downwardly to abut against the downwardly extending flange portion 27A of the supporting portion 27.

There are provided auxiliary means for limiting longitudinal movement of the pads along the peripheral edge portion embraced by each, that is to limit lateral movement of the pads along the edges of the plate 15. In the case of clamping bracket 22, there are provided in the opposite ends thereof tongues 22A and 22B which extend downwardly over the opposite ends of the pad 18. Thus, the pad 18 is held in position, and as the tongues 22A and 22B contact only the material of the pad 18, the avoidance of metal to metal contact is maintained.

Also, in the case of the forwardmost clamping bracket 23, it is provided with downwardly extending tongues 23A and 23B at its opposite ends which also contact the ends of the pad 19 to limit longitudinal movement thereof, the avoidance of metal to metal contact still maintained.

In the case of the left-hand clamping bracket 25, there is provided at one end of the bracket 25 a tongue 25A which similarly extends downwardly to engage one end of the pad 21 and thus to limit longitudinal movement in that direction.

At the other end of the pad 21 the plate 15 has a protruding portion 15B in line with the rubber pad 21 and which thus limits longitudinal movement of the pad in that direction, metal to metal contact still being avoided. At the end of the pad where tongue 25A is located, plate 15 is cut away at 15A to provide appropriate space.

In the case of the right-hand clamping bracket 24, there is a tongue 24A extending downwardly from the bracket to engage the end of the pad 20 and thus to limit longitudinal movement of the pad in that direction. Also on the right-hand side of plate 15 there is a protruding portion 15C in line with the pad 20 and thus limits longitudinal movement of the pad in that direction and again avoidance of metal to metal contact is maintained.

In this manner, the pads are firmly held down upon the supporting portion 27 and firmly held in against the peripheral edge portions of the plate embraced by the pads. At the same time, displacement of the pads longitudinally thereof is prevented.

It is noted that the weight of the engine is well distributed and transmission of vibratory motion between the engine and the supporting portion 27 of the tractor or the like at the critical locations is greatly minimized.

If desired, the plate 15 may be first secured to the engine 12, thereafter the pads positioned over the four peripheral edges above described and then the clamping brackets may be positioned and fastened down to the supporting portion 27. Also, if desired, the forward clamping bracket 23 may first be secured to the supporting portion 27 of the tractor or the like and the plate 15 with the pads mounted thereon as shown, placed in position so that the plate 15 slides under and within the clamping bracket 23 then already in position. Thereafter the clamping brackets 22, 24 and 25 are secured downwardly and in position by means of the bolt and nut assemblies 26.

It is to be understood that this invention is utilizable for mounting various kinds of engines to various kinds of implements and vehicles.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Mounting means for use in mounting an engine to a tractor or the like for minimizing transmission of vibration between the engine and tractor or the like, the said tractor or the like having a supporting portion disposed in a generally horizontal plane, comprising the combination of a four-sided plate member adapted to have an engine secured thereto, said plate member at each of its four sides having outwardly facing peripheral edge portions disposed along spaced edges thereof, the edge portions along one pair of opposite sides being spaced from the edge portions of another pair of opposite sides to isolate said edge portions of adjacent sides, a plurality of resilient rubber-like pads, said pads having a U-shape cross-section to provide a recess therein directed toward said plate member, the said peripheral edge portions of said plate member at each of said four sides being disposed in the recesses of said pads, respectively, to be firmly embraced by the spaced arms and base of the U-shaped pad, said pads extending along substantially the lengths of said peripheral edge portions, respectively, of said plate member, and said recesses of the pads extending through the length of the respective pads and accommodating the said peripheral edge portions of the plate members along the lengths of said peripheral edge portions to open toward the said plate member along the lengths of the pads, and a plurality of clamping members for holding said pads to said supporting portion of the tractor or the like, said clamping members having generally horizontally disposed off-set portions disposed to engage the upper surface of a said pad and having first generally upright portions disposed to engage the outer longitudinally extending surface of a said pad whereby a pad is firmly embraced by a said clamping member, said clamping members each having a securing portion adapted to be secured to said supporting portion of the tractor, said securing portions being generally in a plane parallel to the plane of said off-set portions and being extended from said upright portions, respectively, in a direction opposite to that of the off-set portions to extend away from said plate member, each said pad being held firmly down on said supporting portion of the tractor or the like by a said clamping member, the peripheral edge portions of the plate member being spaced from contact engagement with said supporting portion of the tractor or the like by the said pads embracing said peripheral edge portions of the plate member.

2. Means as claimed in claim 1 and in which said plate member has a plurality of sets of holes therein for accommodating bolts to secure thereto different engines having variously spaced securing lugs to be secured to a said plate member, the holes of one set of holes being positioned closer to the center of said plate member than the holes of another set of holes to correspond to the positions of one set of lugs closer to the corresponding center of one engine than the positions of another set of lugs of another engine.

3. Means as claimed in claim 1 and in which said plate member has a central open space therein for accommodating a driving shaft extending downwardly from said engine, said central open space having a flange formed substantially around the peripheral edge thereof to rigidize the said plate member about said open space.

4. Means as claimed in claim 1 and in which said clamping members carry second generally upright portions at least at one end of said clamping member abutting an outermost end of a said pad at a location beyond the end of a said peripheral edge portion accommodated in the recess of said pad to limit longitudinal movement of a said pad along the peripheral edge portion embraced by the pad.

5. Means as claimed in claim 4 and to which said plate member includes abutting portions extending outwardly at an end of at least one of said peripheral edge portions to abut a pad embracing the respective peripheral edge portion to limit longitudinal movement of said pad along said peripheral edge portion, said abutting portions of the plate member and said second upright portions of the clamping members embracing said pads, respectively, therebetween.

6. Mounting means for use in mounting an engine to a tractor or the like to minimize transmission of vibration therebetween, comprising a rigid plate member adapted to have a said engine secured thereto, said plate member having peripheral edge portions disposed along opposite spaced sides thereof longitudinally and laterally of said tractor, said peripheral edge portions projecting forwardly and rearwardly from the body of the plate member longitudinally of the tractor and projecting in opposite lateral directions from the body of the plate member laterally of the tractor, a plurality of resilient rubber-like pads, each pad engaging a said peripheral edge portion along the top surface, bottom surface and outer edge surface of a respective peripheral edge portion, each said peripheral edge portion being firmly embraced by a pad and the plate member being embraced between pads on opposed spaced sides thereof by opposed pads, and a plurality of clamping members secured to said tractor or the like, each said clamping member engaging a said pad along its upper and outer longitudinal surface thereof to clamp the pad to the tractor or the like holding the plate member embraced by the pad to the tractor or the like and for holding the plate member between the pads on opposite spaced sides of the plate member, opposed clamping members and the respective pads clamped thereby being disposed to firmly hold the plate member therebetween against longitudinal and lateral movement relative to said tractor, whereby the plate member is isolated from the tractor or the like and from said clamping member by said pads.

7. Means as claimed in claim 6 and including abutting mean carried by one of said plate member and said clamping members to limit longitudinal movement of a pad along the peripheral edge portion embraced by the pad.

8. Means as claimed in claim 6 and including projecting portions extending along an end of a pad to limit longitudinal movement of the pad along a said peripheral edge.

9. Means as claimed in claim 6 and including on an end of a clamping member a projecting portion along the end of a pad to abut the pad and limit longitudinal movement of the pad along the peripheral edge portion embraced by the pad.

* * * * *